US011209916B1

(12) United States Patent
Zimmermann et al.

(10) Patent No.: US 11,209,916 B1
(45) Date of Patent: Dec. 28, 2021

(54) DOMINANT HAND USAGE FOR AN AUGMENTED/VIRTUAL REALITY DEVICE

(71) Applicant: Logitech Europe S.A., Lausanne (CH)

(72) Inventors: Remy Zimmermann, Pully (CH); Andreas Connellan, Dublin (IE); Mario Gutierrez, Renens (CH); Zhantao Deng, Saint-Sulpice (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/943,961

(22) Filed: Jul. 30, 2020

(51) Int. Cl.
*G06F 3/038* (2013.01)
*G06F 3/0346* (2013.01)

(52) U.S. Cl.
CPC .......... *G06F 3/038* (2013.01); *G06F 3/0346* (2013.01); *G06F 2203/0384* (2013.01)

(58) Field of Classification Search
CPC .............................. G06F 3/038; G06F 3/0346
See application file for complete search history.

(56) References Cited

U.S. PATENT DOCUMENTS

| | | | |
|---|---|---|---|
| 9,123,171 B1* | 9/2015 | Chavez | H04N 13/366 |
| 9,549,174 B1* | 1/2017 | Chavez | G06F 3/012 |
| 10,127,715 B2* | 11/2018 | Champion | G06F 3/03542 |
| 10,271,043 B2* | 4/2019 | Champion | G06F 3/0482 |
| 2014/0168142 A1* | 6/2014 | Sasselli | G06F 3/0416 345/174 |
| 2016/0124528 A1* | 5/2016 | Feng | G06F 3/03545 345/179 |
| 2017/0102791 A1* | 4/2017 | Hosenpud | G06F 3/0481 |
| 2018/0173323 A1* | 6/2018 | Harvey | G06F 3/017 |
| 2019/0113966 A1* | 4/2019 | Connellan | G01S 5/16 |
| 2019/0302896 A1* | 10/2019 | Perelli | G06F 3/0362 |
| 2020/0042111 A1* | 2/2020 | Connellan | G02B 27/0172 |
| 2020/0310561 A1* | 10/2020 | Connellan | G06F 3/0346 |

* cited by examiner

*Primary Examiner* — Chun-Nan Lin
(74) *Attorney, Agent, or Firm* — Kilpatrick Townsend & Stockton LLP

(57) ABSTRACT

In some embodiments, a stylus device can be configured for use in an augmented/virtual reality (AR/VR) environment. The stylus device can be configured to be used differently in a right hand or a left hand of a user. Determination of whether the stylus device is used in the left hand or the right hand can be used to improve tracking of the stylus device for use as a control device for the AR/VR environment.

20 Claims, 5 Drawing Sheets

500 receiving an indication of whether an interface device is to be held in the left hand or the right hand of the user —502 receiving, using a sensor configured to detect, locations of one or more tracking features of the interface device, data indicative of locations in a real space of respective ones of the one or more tracking features —504 identifying an orientation of the interface device in the real space wherein the orientation is determined based on the indication of whether the interface device is to be held in the left hand or the right hand of the user —506 translating the orientation of the interface device in the real space for representation in a virtualized space —508

Modifying a function of the interface device based on the determination that the stylus is used in the left hand or the right hand of the user —510

*FIG. 5*

DOMINANT HAND USAGE FOR AN AUGMENTED/VIRTUAL REALITY DEVICE

BACKGROUND

Virtual, mixed, or augmented reality can be associated with a variety of applications that comprise immersive, highly visual, computer-simulated environments. These environments, commonly referred to as augmented-reality (AR)/virtual-reality (VR) environments, can simulate a physical presence of a user in a real or imagined world. The computer simulation of these environments can include computer rendered images, which can be presented by means of a graphical display. The display can be arranged as a head mounted display (HMD) that may encompass all or part of a user's field of view.

A user can interface with the computer-simulated environment by means of a user interface device or peripheral device, otherwise known as a controller. Contemporary AR/VR systems may use various controllers, such as pistol grip controllers, which can typically operate with three or six degrees-of-freedom (DOF) of tracked movement, depending on the particular system. When immersed in a computer-simulated AR/VR environment, the user may perform complex operations associated with the interface device, including simulated movement, object interaction and manipulation, and more. Tracking of controllers in contemporary AR/VR systems is a power and calculation intensive operation especially to obtain a level of accuracy to enable fine operations. Thus, there is a need for improvement in interface devices when operating within virtualized environments, especially when performing tasks that require a high degree of accuracy, precision, and/or fine control.

BRIEF SUMMARY

In certain embodiments, a virtualization stylus system is disclosed including a stylus configured to be held in a right hand or a left hand of a user. The stylus can include one or more emitters. The system can also include a head-mounted display (HMD) device including a housing; a head-mounting apparatus coupled to the housing, the head-mounting apparatus configured to couple the HMD device with a head of a user; a display coupled to the housing in an orientation such that it is viewable by the user when the HMD device is coupled with the head of the user; one or more sensors coupled to the housing, the one or more sensors configured to have a field of view including a hand of the user when the HMD device is coupled with the head of the user; and one or more processors coupled to the one or more sensors and the housing.

The one or more processors can be configured to receive an indication of whether the stylus is to be held in the left hand or the right hand of the user; receive, using the sensor, data indicative of locations in the real space of respective ones of the one or more emitters; identify, using the data indicative of the location of the respective ones of the one or more emitters, an orientation of the stylus in the real space wherein the orientation is determined based on the indication of whether the stylus is to be held in the left hand or the right hand of the user; translate the orientation of the stylus in the real space for representation in a virtualized environment viewable by the user via the display when the HMD device is coupled with the head of the user; and render the stylus in the virtualized environment in an orientation corresponding to the orientation of the stylus in the real space.

The one or more emitters can form a different pattern on a left side of the stylus than the right side of the stylus. The identification of the orientation of the stylus can be based on the indication of whether the stylus is to be held in the left hand or the right hand of the user and can include searching for a left side pattern of the emitters or a right side pattern of the emitters. The identification of the orientation of the stylus can be based on the indication of whether the stylus is to be held in the left hand or the right hand of the user and can include prioritizing a respective left-hand side or right-hand side subset of the field of view of the one or more sensors. The one or more emitters can be light emitters and the one or more sensors are configured to detect light emitted by the one or more emitters.

Certain aspects of the disclosure regard techniques pertaining to a virtualization stylus system that can include a stylus configured to be held in a right hand or a left hand of a user. The stylus can include one or more tracking features. The system can also include a sensor configured to detect the one or more tracking features of the stylus. The system can also include one or more processors coupled to the sensor. The one or more processors can be configured to receive an indication of whether the stylus is to be held in the left hand or the right hand of the user; receive, using the sensor, data indicative of locations in a real space of respective ones of the one or more tracking features; identify, using the data indicative of the location of the respective ones of the one or more tracking features, an orientation of the stylus in the real space wherein the orientation is determined based on the indication of whether the stylus is to be held in the left hand or the right hand of the user; and translate the orientation of the stylus in the real space for representation in a virtualized space.

The sensor can be external to the stylus. The indication of whether the stylus is to be held in the left hand or the right hand of the user can be determined based on a profile of the user of the stylus wherein the profile indicates whether the user uses the stylus in his/her left hand or his/her right hand. The indication of whether the stylus is to be held in the left hand or the right hand of the user can be determined based on one or more readings from an inertial measuring unit (IMU) of the stylus. The indication of whether the stylus is to be held in the left hand or the right hand of the user can be determined based on an orientation of the stylus determined using the IMU compared to a gravity vector. The indication of whether the stylus is to be held in the left hand or the right hand of the user can be determined based on an orientation of the stylus determined by comparing a magnetic vector determined using the IMU of the stylus and comparing the magnetic vector of the stylus with a magnetic vector of an IMU of an external virtualization host device.

The one or more processors can be configured to identify a pose, based on the indication of whether the stylus is to be held in the left hand or the right hand of the user of the stylus, using a first set of the one or more tracking features; and after identifying the pose of the stylus, track orientation of the stylus in the real space using a second set of the one or more tracking features. The stylus can include one or more input elements and the indication of whether the stylus is to be held in the left hand or the right hand of the user is based on detected pressure applied to the one or more input elements.

BRIEF DESCRIPTION OF THE DRAWINGS

Aspects, features and advantages of embodiments of the present disclosure will become apparent from the following description of embodiments in reference to the appended drawings.

FIG. 5 shows a flowchart illustrating a method operating an AR/VR system according to certain techniques of the disclosure.

DETAILED DESCRIPTION

Figure 1:
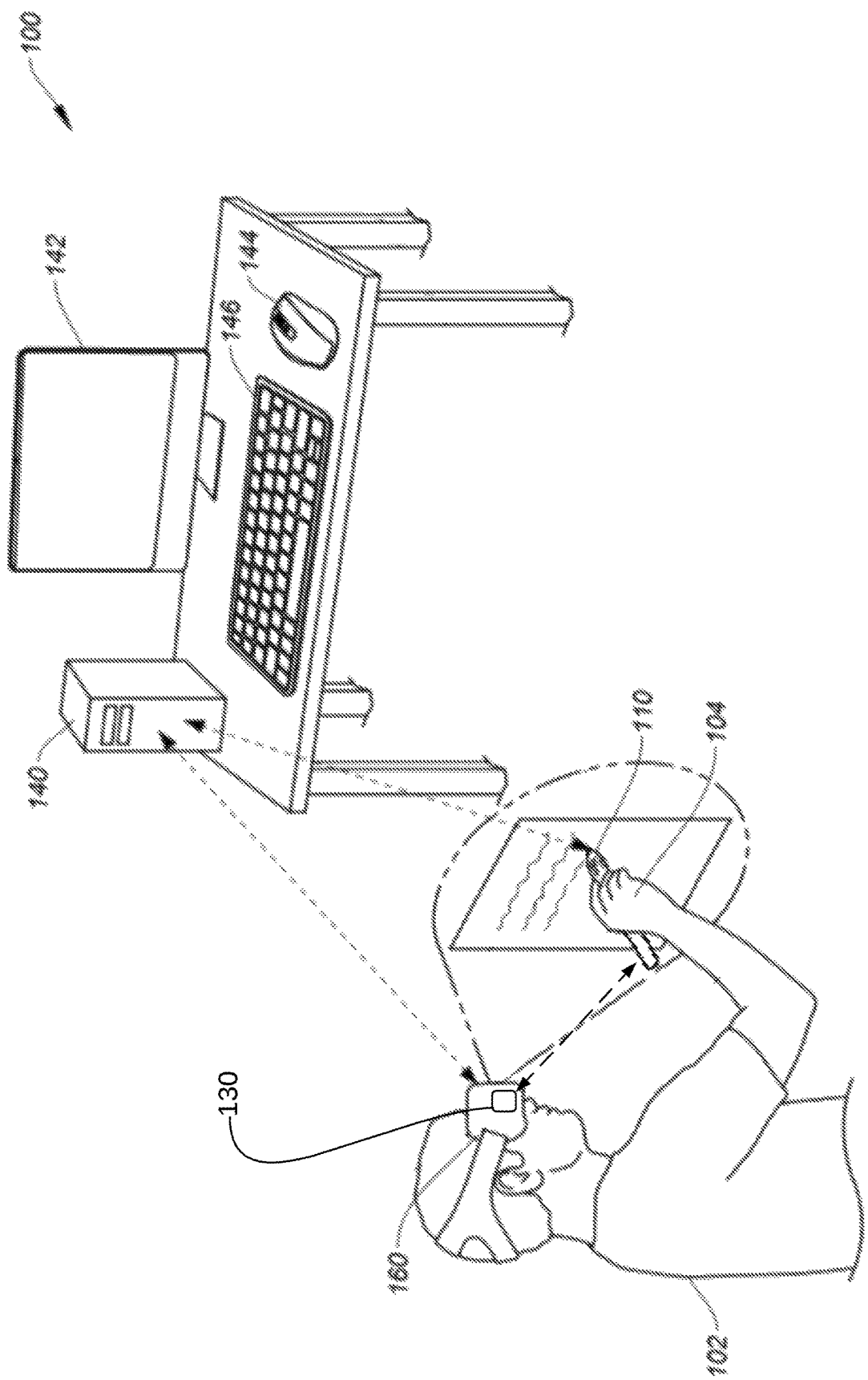
FIG. 1 shows a user operating a stylus device in an augmented/virtual reality environment.

Embodiments of this invention are generally directed to control devices configured to operate in AR/VR-based systems. More specifically, certain embodiments relate to techniques to improve the tracking and/or functions of control devices depending on a determination of a hand of a user that will be used to operate a control device.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

To provide a high level, broad understanding of some aspects of the present disclosure, a non-limiting summary of certain embodiments are presented here. In many conventional AR/VR systems currently in the market, control devices, such as pistol-grip control devices, are tracked as they move through real space. The real space orientation and position of the control device can be used to enable interactions in virtual space presented to a user such that the user can interact with the virtual space using the control device in real space. The tracking can be performed by detecting one or more tracking features on the control device, such as light or ultrasound emitters. The tracking features can form a pattern on the control device that may form a semi-unique image that can be detected by a sensor external to the tracking device. In addition, or alternatively, a control device can include one or more sensors (e.g., imaging sensor(s) and/or internal measurement unit(s) (IMU)), to enable the control device to detect its orientation in real space.

The determination of the position and orientation of the control device using the described sensor systems can be very computationally and/or power intensive or may provide insufficient performance as will be described further herein. Certain tracking systems may use a combination of sensor systems and/or tracking features and may gather multiple sensor readings over time to improve tracking performance of a control device for use in an AR/VR system. Techniques disclosed herein can be used to improve tracking performance of control devices for AR/VR systems.

Disclosed techniques can use knowledge of the use of the control device to improve tracking performance for the control device and/or modify operation of the control device. For example, a determination can be made as to whether a control device is to be operated with a left hand or a right hand of a user. A stylus-type of control device, for example, may primarily be used by a dominant hand of a user through which the user has more finite motor control. The knowledge of which hand that a user will use to operate a control device may be used to bound tracking of the control device. For example, a certain pattern of tracking features or emitters on the control device may be searched for which may be known to be more likely to be facing a corresponding sensor as opposed to searching for every tracking feature or pattern on a control device. The control device may also power on certain emitters for tracking by an external sensor that are likely to be facing the sensor and therefore detectable by the sensor while not powering the remaining emitters. Many further techniques are disclosed herein regarding use of knowledge regarding use of a certain hand with a control device.

In certain exemplary embodiments, the interface device can be a stylus device configured for use in an augmented/virtual (AR/VR) reality environment that includes a housing with a bottom portion and a top portion. One or more processors and a communications module configured to establish a wireless electronic communication between the stylus device and at least one host computing device can be disposed in the housing. In some cases, the bottom portion of the housing can be substantially linear and configured to be held by a user's hand while the stylus device is in use. The bottom portion can include one or more input elements configured to generate control signals in response to being activated by the user's hand and a tip at an end of the bottom portion configured to operate as an interface between the stylus device and objects within the AR/VR environment. The top portion of the housing can include a number of emitters or sensors, which can facilitate a tracking of the stylus device in three-dimensional space. The use of emitters (e.g., infra-red LEDs or ultrasound emitters) and/or sensors (e.g., infra-red detectors or microphones) may depend on the type of tracking infrastructure used by the AR/VR system. The emitter or sensors can be configured such that at least four are visible from any point 360 degrees axial to the orientation of the stylus device (e.g., completely around the sides of the stylus device), although some embodiments may have facets configured on different portions of the stylus device to allow at least 3 or 4 to be visible from anywhere around the stylus device. In operation, the bottom portion of the housing may be held by a user's hand in a pen-grip configuration. One of ordinary skill in the art with the benefit of this disclosure would understand the many variations, modifications, and alternative embodiments thereof that extend beyond the non-limiting example described above.

Definitions

The present disclosure may be better understood in view of the following explanations:

As used herein, the terms "computer simulation" and "virtual reality environment" may refer to a virtual reality, augmented reality, mixed reality, or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-learning simulation; or other like simulation. The simulated environment may be two or three-dimensional.

As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment.

As used herein, the terms "mixed reality" or "MR" may include use of virtual objects that are rendered as images in conjunction with a real-world view of an environment wherein the virtual objects can interact with the real world environment. Embodiments described below can be implemented in AR, VR, or MR environments.

As used herein, the term "real-world environment" or "real-world" may refer to the physical world (also referred to herein as "physical environment." Hence, the term "real-world arrangement" with respect to an object (e.g., a body part or user interface device) may refer to an arrangement of the object in the real-world and may be relative to a reference point. The term "arrangement" with respect to an object may refer to a position (location and orientation). Position can be defined in terms of a global or local coordinate system.

As used herein, the term "rendered images" or "graphical images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiments, the circuitry may include one or more virtual machines that can provide the described functionality. In certain embodiments, the circuitry may include passive components, e.g. combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor(s)" or "host/local processor(s)" or "processing resource(s)" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device (e.g., a stylus device), which may include a user interface device and/or an HMD; a computer (e.g., a personal computer or like device); or other device in communication with a computer system.

As used herein, the term "computer readable medium/media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include; a modulated signal passed through a signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning interface devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of: a camera system; a magnetic field based system; capacitive sensors; radar; acoustic; other suitable sensor configuration, optical, radio, magnetic, and inertial technologies, such as lighthouses, ultrasonic, IR/LEDs, SLAM tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); or other device in communication with the system.

As used herein, the term "camera system" may refer to a system comprising a single instance or a plurality of cameras. The camera may comprise one or more of: a 2D camera; a 3D camera; an infrared (IR) camera; a time of flight (ToF) camera; a dynamic vision sensor (DVS) camera. The camera may include a complementary metal-oxide-semiconductor (CMOS), a charge-coupled device (CCD) image sensor, or any other form of optical sensor in use to form images. The camera may sense IR, which can be used for object tracking or for tracking IR emitters that are invisible to the naked eye. The camera may include a red-green-blue (RGB) camera, which may be used for generation of real world images for augmented or mixed reality simulations. In an embodiment different frames of a single camera may be processed in an alternating manner, e.g., with an IR filter and for RGB, instead of separate cameras. Images of more than one camera may be stitched together to give a field of view equivalent to that of the user. A camera system may be arranged on any component of the system. In an embodiment, the camera system is arranged on a headset or HMD, wherein a capture area of the camera system may record a field of view of a user. Additional cameras may be arranged elsewhere to track other parts of a body of a user. Use of additional camera(s) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. The camera system may provide information, which may include an image stream, to an application program, which may derive the position and orientation therefrom. The application program may implement known techniques for object tracking, such as feature extraction and identification.

As used herein, the term "user interface device" may include various devices to interface a user with a computer, examples of which include: pointing devices including those based on motion of a physical device, such as a mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands. In many of the embodiments described herein, the user interface device is a stylus-type device for use in an AR/VR environment.

As used herein, the term "IMU" may refer to an Inertial Measurement Unit which may measure movement in six Degrees of Freedom (6 DOF), along x, y, z Cartesian coordinates and rotation along 3 axes—pitch, roll and yaw. In some cases, certain implementations may utilize an IMU with movements detected in fewer than 6 DOF (e.g., 3 DOF as further discussed below). Any IMU may include one or more accelerometers and/or magnetometers. The IMU may be a 6 axis IMU (e.g., 3 accelerometers and 3 corresponding gyroscopes) or a 9 axis IMU (e.g., 3 accelerometers, 3 corresponding gyroscopes, and 3 corresponding magnetometers).

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternatively, the keyboard can be a virtual keyboard displayed in an AR/MR/VR environment.

As used herein, the term "fusion" may refer to combining different position-determination techniques and/or position-determination techniques using different coordinate systems to, for example, provide a more accurate position determination of an object. For example, data from an IMU and a camera tracking system, both tracking movement of the same object, can be fused. A fusion module as described herein performs the fusion function using a fusion algorithm. The fusion module may also perform other functions, such as combining location or motion vectors from two different coordinate systems or measurement points to give an overall vector.

Note that the various embodiments of interface devices described herein often refer to a "bottom portion" and a "top portion," as further described below. Note that the bottom portion (the portion typically held by a user) can also be referred to as a "first portion" and both terms are interchangeable. Likewise, the top portion (the portion typically including the sensors and/or emitters) can be referred to as the "second portion," which are also interchangeable.

Typical AR/VR System Environment

Some basic elements of a typical AR/VR system include a device to immerse the user in an AR/VR environment (e.g., an HMD, holographic emitter, audio system, haptic feedback system, or the like), one or more interface devices (e.g., a stylus, remote control, joystick, pistol grip controller, etc.) that allow the user to interface with the AR/VR environment, and a tracking system to track the location of the user, which may include tracking the location of the HMD, the interface device, and/or other devices (e.g., wearables, etc.). One or more computing devices (e.g., desktop computer, laptop computers, gaming platforms, entertainment/media systems, cloud-based systems, combinations thereof, etc.) can be used to communicate with and control the various input and output elements.

There are a number of different types of tracking systems that can be used to track the location/orientation of an interface device, according to certain embodiments. "Outside in" systems typically use external devices to track the headset (e.g., HMD) and accessories (e.g., stylus device). The external tracking devices (e.g., cameras, IR sensors, etc.) may be placed around the room and can be directed generally toward the HMD and/or interface device and can be configured to determine the position and orientation of the HMD and interface device in relations to the AR/VR environment. Outside-in systems can have much latency and may be very accurate, which can be further enhanced by incorporating additional tracking devices. Outside-in systems may also be able to track devices within a single tracking space (e.g., with a common coordinate system). Some downsides associated with outside-in (otherwise known as ego-centric) systems include the need to remain in a set field of view, as well as the problem of occlusion, as outside-in tracking tends to rely on line-of-sight tracking. Thus, outside-in systems typically need 360 degrees of tracking capability or risk losing a tracked location and orientation of the HMD and interface device when the user turns or moves in certain positions or locations. Thus, kinematic constraints may not be able to be taken advantage of in an outside-in system but may be available to an inside-out system.

In "inside-out" systems (otherwise known as exo-centric systems), a camera or sensor array is placed on the user of a device being tracked (e.g., HMD, stylus device) or on the device itself. This is opposed to "outside-in" systems wherein sensors are placed in fixed locations to image an environment including the device and/or the user. As a tracked device moves in a real-world environment, the new tracked coordinates are updated in real-time. In some cases, inside-out tracking can be supplemented with fiducial markers to improve position/orientation tracking. One advantage is that a user can have greater freedom in movement within the virtual world without requiring sensors to be placed around the room. One disadvantage is that all computations occur within the tracked system itself, such as by the HMD, which can create performance limitations. One of ordinary skill in the art with the benefit of this disclosure would understand the many variations, modifications, and alternative embodiments of the various AR/VR systems that are available and how embodiments of the interface devices (e.g., stylus devices) described herein may operate in these various systems. One such embodiment is shown and described below with respect to FIG. 1.

FIG. 1 shows a user 102 operating a stylus device 110 in an "inside-out" AR/VR environment 100, according to certain embodiments. AR/VR environment 100 can include a computer 140 and any number of peripherals, which may include a display device 142, computer mouse 144, keyboard 146, or other input/output device. User 102 is shown wearing a head-mounted display 160 and using stylus device 110 to draft a letter on a virtual parchment 165. HMD 160 can include one or more sensors 130 that may be in electronic communication with stylus device 110. As shown, user 102 is using a dominant hand 104 to hold and manipulate stylus device 110. HMD 160 may include one or more displays that can be viewed by user 102. Virtual parchment 165 may be viewable by user 102 using the display of HMD 160. User 102 may manipulate stylus device 110 in real space using dominant hand 104 to manipulate virtual parchment 165 in virtual space viewable by the display of HMD 160.

As shown in FIG. 1, user 102 can manipulate a user interface device, stylus device 110, with high accuracy and precision. Stylus device 110 may include emitters (e.g., IR LEDs). Alternatively or additionally, stylus device 110 may include a plurality of sensors for tracking in real space, which may perform movement and orientation calculations locally (e.g., by processor(s) 210) or externally (e.g., by HMD 160, computer 140, etc.). One of ordinary skill in the art with the benefit of this disclosure would understand the many variations, modifications, and alternative embodiments thereof for tracking stylus device 110 with the various types of AR/VR tracking systems in use.

Simplified System Embodiment for AR/VR Interface Device

Figure 2:
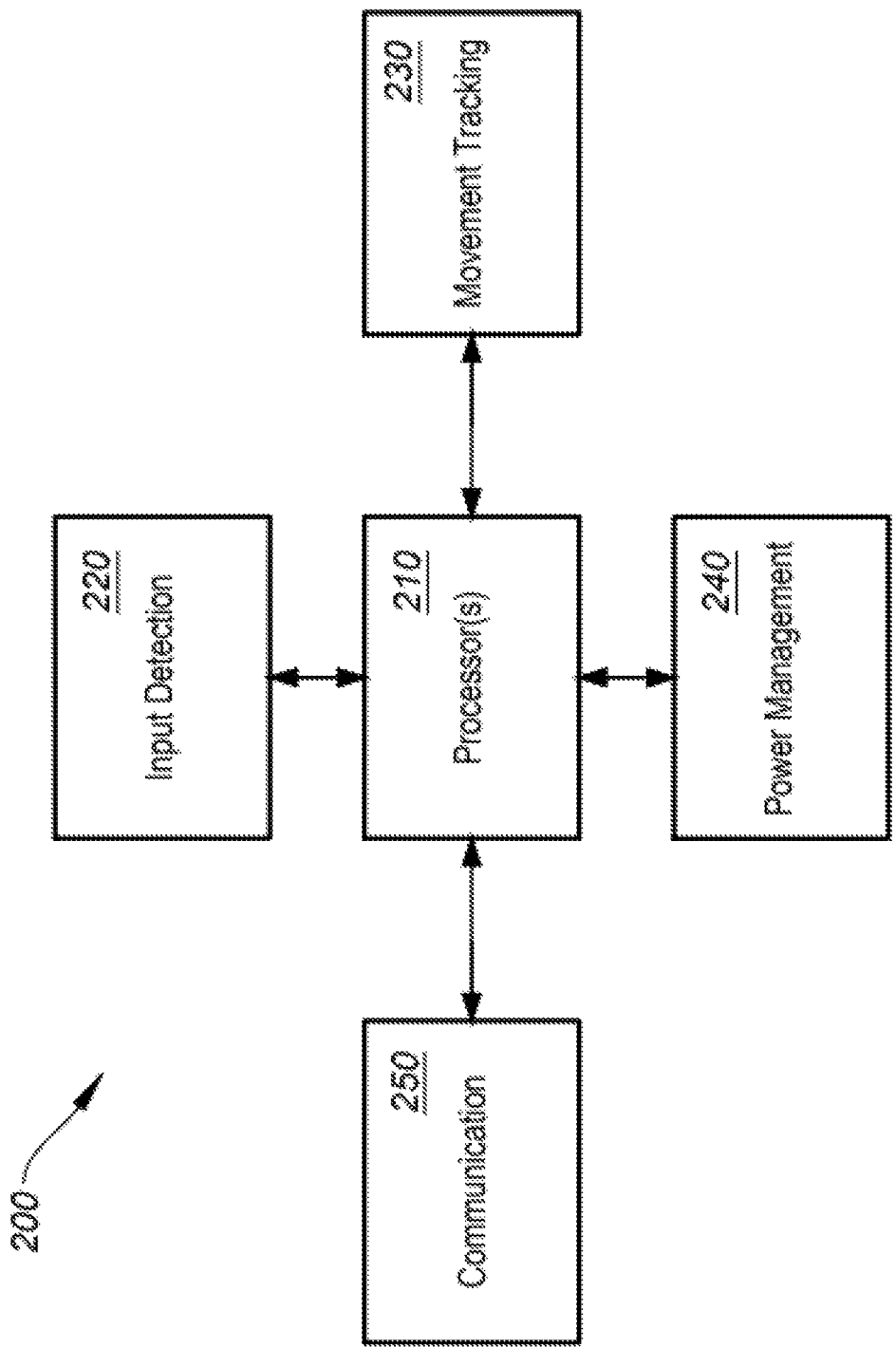
FIG. 2 shows a simplified block diagram of a device for use in an AR/VR system, according to certain embodiments.

FIG. 2 shows a simplified system block diagram ("system") 200 of a stylus device 110 or HMD 160, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (μCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 200. For example, communications block 250 may include a local processor to control communication with computer 140 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth); however, multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation (e.g., controls 416 of FIG. 4A, buttons, triggers, etc.), scroll wheel and/or trackball manipulation (e.g., rotation detection), sliders, switches, touch sensors (e.g., one and/or two-dimensional touch pads), force sensors, and the like. The activated input element (e.g., button press) may generate a corresponding control signal (e.g., human input device (HID) signal) to control a computing device (e.g., HMD 160) communicatively coupled to interface device 110 (e.g., instantiating a "grab" function in the AR/VR environment). Alternatively, the functions of input detection block 220 can be subsumed by processor 210, or in combination therewith.

In some embodiments, input detection block 220 can detect a touch or touch gesture on one or more touch sensitive surfaces, as described above. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of interface device 110 may or may not utilize touch detection or touch sensing elements.

In some aspects, input detection block 220 can control the operating of haptic devices implemented on an interface device. For example, input signals generated by haptic devices can be received and processed by input detection block 220. For example, an input signal can be an input voltage, charge, or current generated by a piezoelectric device in response to receiving a force (e.g., user touch) on its surface. In some embodiments, input detection block 220 may control an output of one or more haptic devices on interface device 14. For example, certain parameters that define characteristics of the haptic feedback can be controlled by input detection block 220. Some input and output parameters can include a press threshold, release threshold, feedback sharpness, feedback force amplitude, feedback duration, feedback frequency, over voltage (e.g., using different voltage levels at different stages), and feedback modulation over time. Alternatively, haptic input/output control can be performed by processor 210 or in combination therewith.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Movement tracking block 230 can be configured to track or enable tracking of a movement of interface device 110 in three dimensions in an AR/VR environment. For outside-in tracking systems, movement tracking block 230 may include a plurality of emitters (e.g., IR LEDs) disposed on an interface device, as shown for example in FIG. 7, fiducial markings, or other tracking implements, to allow the outside-in system to track the interface device's position, orientation, and movement within the AR/VR environment. For inside-out tracking systems, movement tracking block 230 can include a plurality of cameras, IR sensors, or other tracking implements to allow the inside-out system to track the interface device's position, orientation, and movement within the AR/VR environment. Preferably, the tracking implements (also referred to as "tracking elements") in either case are configured such that at least four reference points on the interface device can be determined at any point in time to ensure accurate tracking. Some embodiments may include emitters and sensors, fiducial markings, or other combination of multiple tracking implements such that the interface device may be used "out of the box" in an inside-out-type tracking system or an outside-in-type tracking system. Such embodiments can have a more universal, system-agnostic application across multiple system platforms.

In certain embodiments, an inertial measurement unit (IMU) can be used for supplementing movement detection. IMUs may be comprised of one or more accelerometers, gyroscopes, or the like. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine a velocity, physical orientation, and acceleration of interface device 110 in 3D space. In some embodiments, gyroscope(s) can be used in lieu of or in conjunction with accelerometer(s) to determine movement or interface device orientation in 3D space (e.g., as applied in a VR/AR environment). An IMU may include one or more magnetometers. In combination, an IMU may sense relative movements (translational and/or rotational) or absolute movements. Relative movements may be sensed over time wherein multiple sensor readings are acquired and differences between readings over the timer periods are used to determine relative movement between them. Absolute movements may use a difference from an absolute reference (e.g., gravity or a magnetic pole of the earth) to determine a current position/orientation of the IMU. It should be noted that absolute readings may also be acquired over time to determine a relative change in position and/or orientation of the IMU. Any suitable type of IMU and any number of IMUs can be incorporated into interface device 110, as would be understood by one of ordinary skill in the art.

Power management block 240 can be configured to manage power distribution, recharging, power efficiency, and the like, for interface device 110. In some embodiments, power management block 240 can include a battery (not shown), a USB-based recharging system for the battery (not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between interface device 110 and HMD 160, computer 140, or other devices and/or peripherals, according to certain embodiments. Communications block 250 can be configured to provide wireless connectivity in any suitable communication protocol (e.g., radio-frequency (RF), Bluetooth, BLE, infra-red (IR), ZigBee, Z-Wave, Logitech Unifying, or a combination thereof).

Although certain systems may not be expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

Figures 3A, 3B:
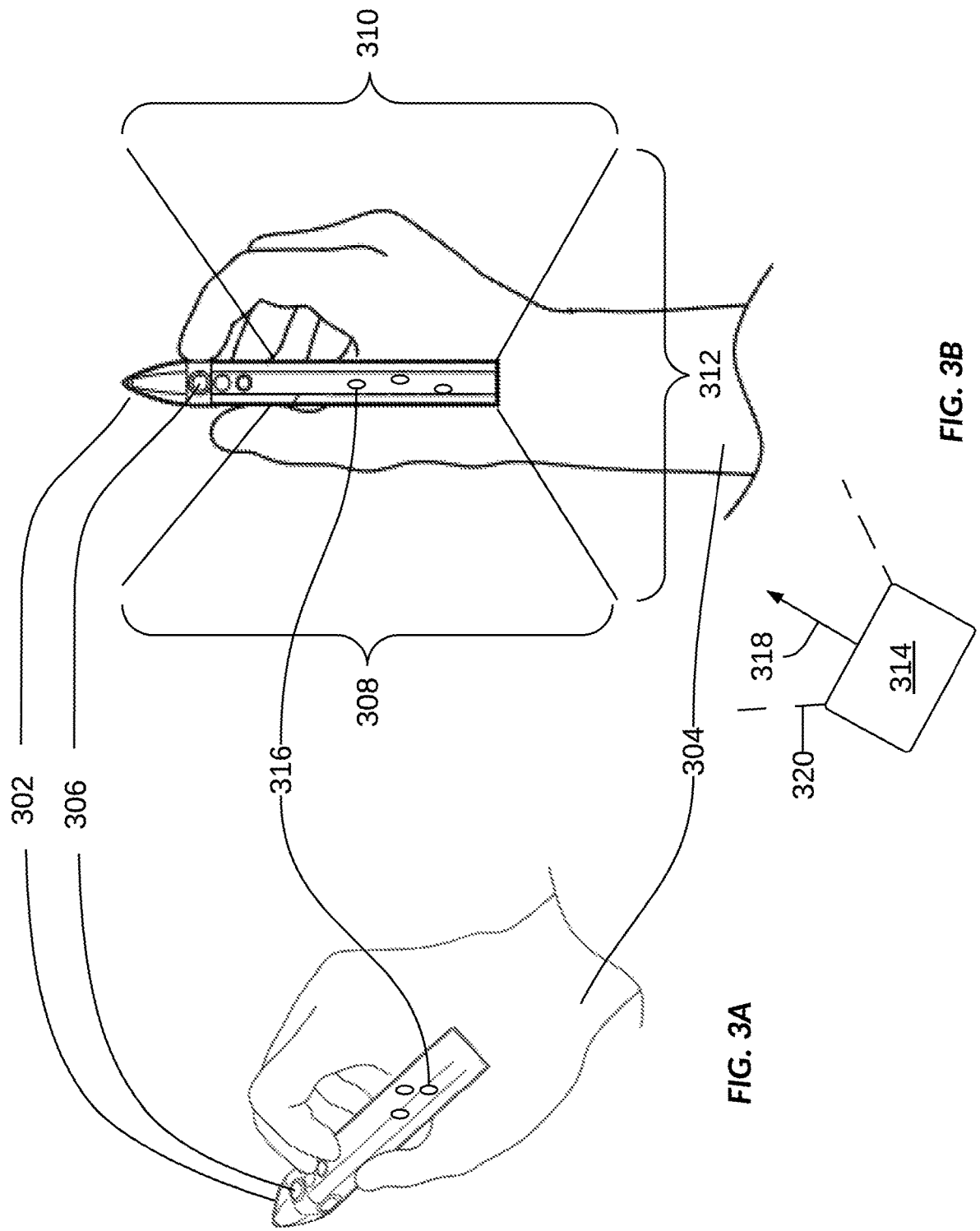
FIG. 3A shows a stylus device configured for operation in an AR/VR environment.
FIG. 3B shows an additional view of the stylus device configured for operation in an AR/VR environment.

FIGS. 3A and 3B illustrate a control device 302 that can be similar to control device 110. Control device 302 is illustrated as being a hand 304 of a user to operate control device 302 for use in an AR/VR system as shown in FIG. 1 or other. When held in hand 304 of user 304, input elements 306 can be actuated by hand 304. As illustrated, control device 302 can include multiple input elements 306. Input elements 306 include push buttons, scroll wheels, touchpads, analog switches, etc. in any configuration.

Control device 302 can be a stylus device, as illustrated, and be held in a pistol-grip by hand of user 304. The user would be unlikely to hold such a control device using both hands as the form factor of control device 302 may not lend itself to such usage. However, aspects of the disclosed techniques could apply to differently shaped or configured control devices that may be held in both hands of a user. Aspects of the disclosed invention can be used for control devices, such as control device 302, that would be held in a different, generally known respective orientation in the left hand and the right hand of a user.

Control device 302 can include tracking feature(s) 316 which can be sensors, emitters, fiducial marks, or other features used to determine an orientation of control device 302 in real space (and/or estimate an orientation and translation of control device 302 in real space). For example, tracking feature(s) 316 can be infrared emitters that may be imaged by a sensor to determine an orientation or control device 302. As such, tracking feature(s) 316 may be arranged to form a unique pattern (e.g., relative locations of the feature(s)) regardless of an angle that a corresponding sensor views the tracking feature(s) 316 as will be further described herein. The emitters may be infrared or other electromagnetic emitters that may be powered by an internal power source (e.g., a battery and/or capacitor) of control device 302 as described with relation to FIG. 2.

In certain embodiments, tracking feature(s) 316 may include sensors themselves used to image a world from inside-out of control device 302 such that control device 302 may be able to determine its orientation in real space without reliance upon or in conjunction with an external tracking sensor. Tracking feature(s) 316 may also include fiducial marks which may be visual markers on a body of control device 302 that may be viewable by an external sensor. In certain embodiments, tracking feature(s) 316 may be or be used in conjunction with an IMU of control device 302 to determine an orientation of control device 302. In summary, tracking feature(s) 316 can be features used to determine an orientation of control device 302 so that its orientation and location in real space can be translated into a virtual environment so that a user can control aspects of the virtual environment by physically moving and actuating control device 302 as explained with regard to FIG. 1, for example.

As illustrated in FIG. 3B, tracking feature(s) 316 may be arranged into different zones. For example, there may be a left zone 308, a right zone 310, and a rear zone 312. Although not illustrated, tracking feature(s) 316 may be organized into any number or combination of zones including a top zone, bottom zone, front zone, or further defined zones. HMD 314 (which may be similar to HMD 160) may be external to control device 302 and may include a sensor (not shown) that has a field of view indicated by dashed lines 320 in a direction of arrow 318. The field of view may extend outward from HMD 314 and may be unable to detect ones of tracking feature(s) 306 that are facing away from HMD 314. For example, if HMD 314 and control device 302 are oriented as illustrated with regard to FIG. 3B, the field of view of the sensor of HMD 314 may be incapable of viewing features in right zone 310. As should be understood, as control device 302 is moved through real space, a side, and therefore a corresponding zone of tracking feature(s) 316, may come into view of an external sensor (such as a sensor of HMD 314).

Figures 4A, 4B:
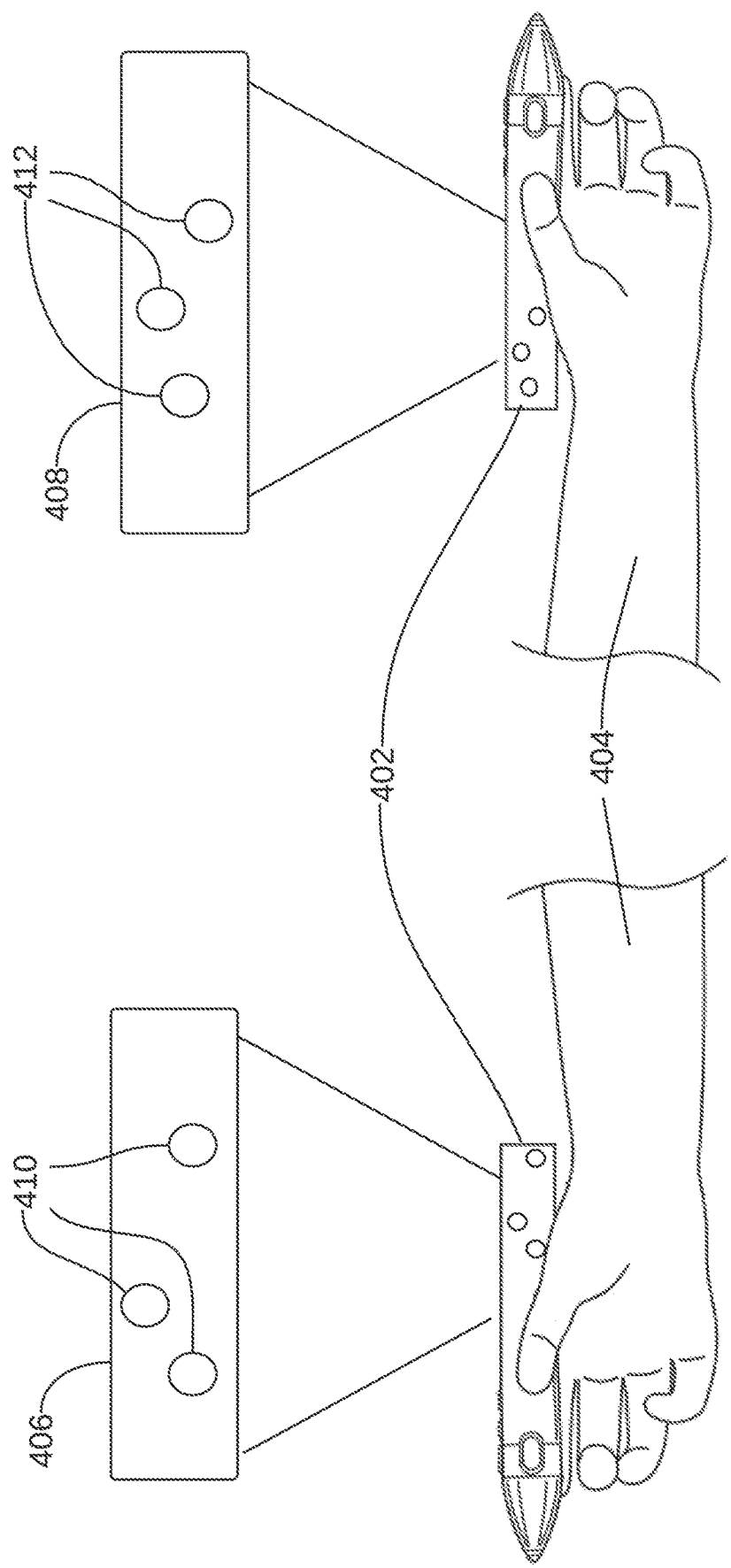
FIG. 4A shows a right hand view of the stylus device configured for operation in an AR/VR environment.
FIG. 4B shows a left hand view of the stylus device configured for operation in an AR/VR environment.

FIGS. 4A and 4B illustrate additional idiosyncrasies pertaining to the field of view of a sensor viewing a control device in a left or a right hand. Illustrated is a control device 402 that can be similar to control device 302 being held in a hand of a user 404. As illustrated in FIG. 4A, the hand of user 404 can be a right hand and in FIG. 4B a left hand of user 404. Both FIGS. 4A and 4B are illustrated from a perspective of a user wearing an HMD (not illustrated), such as HMD 314. The HMD may include a sensor having a field of view as shown in FIGS. 4A and 4B.

Control device 402 may include tracking features arranged into zones similar to the zones explained with regard to FIG. 3B. For example, zone 406 may be similar to left zone 308 that is viewable by a sensor of an HMD when control device 402 is held in a right hand of a user. Similarly, FIG. 4B illustrates a zone 408, including tracking features 412, that can be similar to right zone 310 that is viewable by a sensor of an HMD when control device 302 is being held in a left hand of a user.

As illustrated, tracking features 410 of zone 406 may form a different pattern than tracking features 412 of zone 408. An external sensor can be used to search for a pattern corresponding to the pattern of tracking features 410 or tracking features 412 and correspondingly determine whether a left side or a right side of control device 402 is being viewed by the sensor. Similarly, the orientation of the pattern can be used to determine what direction control device 402 is oriented towards. Extrapolating the same (simplified) techniques to more tracking features in increasingly complex patterns, an orientation of control device 402 can be determined in space as well as a location of control device 402 relative to an external sensor. It should be understood that more than three tracking features can be used to determine a unique or semi-unique pattern that can be used to detect which side of control device 402 is viewed as well as the control device's orientation and/or distance.

As disclosed herein, tracking features, such as tracking features 410 and 412, can be emitters powered by control device 402. The tracking features may be individually and/or selectively powered to aid in detection and tracking of control device 402. Tracking features 410 and 412 may also be sensors configured to detect external emitters. For example, emitters may be arranged on an HMD and overlaying and correlating locations of the emitters within the field of view of multiple sensors of control device 402, its orientation and location relative to the HMD can be determined.

FIG. 5 illustrates a flowchart 500 for determining whether a control device is to be used in a right hand or a left hand of a user. At 502, an indication can be received (e.g., by an AR/VR system) as to whether a control device is to be used in a left hand or a right hand. This indication can be determined in a variety of ways. For example, a sensor can be used to detect whether a left side or a right side of a control device is being viewed by an external sensor using the zones disclosed herein with regard to FIGS. 3B, 4A, and 4B. If a control device is a type known to be held in a certain orientation by a left hand or a right hand of a user and a certain side of the control device is detectable by a sensor of an HMD worn by a user of the control device, for example, then it can be inferred that the control device is being held in a right hand or a left hand of a user.

The orientation (as can be determined using tracking feature(s) of a control device and/or an IMU of the control device) can further be used to determine whether the control device is held by a user as opposed to resting on a desk, for example. In order to determine and identify a certain control device, a tracking system may operate in two different phases, namely a pose identification phase and a tracking phase. During the pose identification phase, a unique orientation of a control device and/or an identity of a control device may be determined. This identification can use a unique pattern of tracking features of a control device, a signal sent by the control device, or similar features to detect and/or determine an orientation of the control device. After the pose is detected (thus determining a relatively high accuracy of orientation and location of the control device) follow on tracking can use fewer tracking features to track relative movement from the pose location. This can be accomplished because the pose can be used as an origin from which relative movement can be tracked and/or the tracking system may have additional information regarding the control device such as which pattern(s) of tracking features to expect. The pose may periodically be updated to improve accuracy and/or if tracking is lost.

The indication of whether the control device is to be used in the left hand or the right hand may also be determined based off of a profile of a user for the control device. For example, information regarding whether the user is left handed or right handed (or otherwise uses a certain control device in a left hand or right hand) can be stored in a profile corresponding to the user. The profile may be accessed when the corresponding user signs into an AR/VR system or is otherwise identified (e.g., via biometric identification or other). In certain embodiments, a certain control device may store user information internally and pass information to a coupled AR/VR system. For example, a control device may be a stylus setup for user A. When the stylus connects to an AR/VR system, it may provide information to the AR/VR system indicating whether it will likely be used in the left hand or right hand of the user.

In certain embodiments, an IMU of a stylus can be used to determine whether it is being used in a left hand or right hand. For example, a gravity or magnetic vector can be detected by an IMU. If the control device is held as indicated in FIG. 4B, for example, pointing down and to the left, the gravity vector may be used to determine this orientation to determine that the control device is held in a right hand of the user. It should be understood that the stylus shown in FIG. 4B may be configured to be held in a certain orientation in a respective left hand or right hand of a user. For example, an input element can be configured to be actuated by an index finger of a user and thus the control device can be highly likely to be held in a known orientation in a left hand as opposed to a right hand. In other words, it would be unlikely for a user to hold the stylus upside down so that he/she would not be able to actuate the input element with his/her index finger.

A magnetometer may be another sensor of an IMU used to determine whether a control device is held in a left hand or a right hand. The magnetometer can give an absolute vector to a magnetic pole of the planet earth. However, this vector may not be exceedingly useful if it is unknown whether a user is facing the north pole or the south pole. Thus, the magnetometer vector of the control device may be used in conjunction with a magnetometer vector of an HMD (or other AR/VR system) of a user using the control device. For example, a user is likely to wear an HMD on his/her head such that the HMD is forward of his/her eyes. Thus, the HMD magnetometer can give an indication of which direction a user may be facing. Similarly, the user would likely hold the control device in front of them. By correlating these two gravity vectors, an orientation indicative of a control device being held in a right hand or a left hand can be determined.

In certain embodiments, a temperatures sensor of a stylus device may be used to determine whether a stylus or other interface device is being held in a left hand or a right hand. For example, an interface device may change in temperature from being in contact with a user. The amount of change in temperature and/or a rate of change in temperature may be detected. The amount of change and/or rate of change may differ across different portions of an interface device. For example, a right side of a stylus held in a right hand of a user may rest on the right hand of a user as illustrated in FIG. 4A. Thus a pattern of temperature change, a location of temperature change, and/or a rate of temperature change of an interface device can be detected and used as an indicator as to whether the interface device is used in a left hand or a right hand.

A geographic location or population information can also be used to infer hand usage by a user. For example, certain geographic locations or populaces have predominantly left hand dominant or right hand dominant populations. Thus, this information can be used to infer whether a user is left handed or right handed. A writing style can also be used to determine an orientation. For example, certain writing systems are written from left to right and others are top to bottom. If a stylus control device is used for writing, the writing system to be used or being used by a user of a stylus can be used to infer the orientation of the stylus as it is moved while writing with the stylus, for example.

In certain embodiments, an actuation profile of input elements can be used to infer whether a control device is held in a left hand or a right hand. For example, a control device may include pressure sensitive input elements that may, for example, rest on a portion of a user's hand as illustrated in FIG. 3A. The pressure sensitive input elements may be mirrored on a left and right side of the control device to enable the same configuration of control device to be used in a left hand or a right hand. By detecting constant or a certain range of pressure on a right side or left side, for example, a control device can be determined to be held in a left hand or a right hand.

It should be understood that the preceeding examples are not mutually exclusive and can be used in any combination and any relative weighting.

At 504, a sensor can be used to detect locations of one or more tracking features of a control device based on the determination that the stylus is being held in a right hand or a left hand. Using the information indicating that the stylus is being held in the left hand or the right hand of the user, the tracking of the stylus can be improved. For example, if it is known that a stylus is being held in a right hand of a user as in FIG. 4B, a pattern of tracking features on the left side can be prioritized for identification and/or tracking as opposed to a pattern of tracking features on the right side. By reducing the number of patterns used to detect an orientation of a control device, the number of computations needed for the orientation determination can be reduced improving power usage, reducing latency, reducing processor heat generation, or having addition effects. If the tracking features are emitters, then zones that are not likely to be viewed by an external sensor may be powered down or deactivated (to reduce power drawn from an internal power source of the control device, for example).

In certain embodiments, a field of view of an external sensor can be cropped to prioritize or only search in a location where the stylus is likely to be located. For example, a sensor may be attached to an HMD and have a field of view in front of the user. If it is detected, a control device is likely to be held in a right hand of a user; a right side of the field of view of the sensor can be prioritized or exclusively used to detect the control device.

In certain embodiments, a sensor of an interface device can be used to image an environment around the interface device to determine if it is being used in a left hand or a right hand of a user. For example, stylus device 110 may include a sensor (imaging, volumetric, or otherwise) that detects an arm or posture of a user. The sensor may be used to construct an image of a body of a user to detect whether stylus device 110 is being held in a left hand or a right hand of a user. The imaging information detected by stylus device 110 may be used in conjunction with sensor(s) 130 of HMD 160 or other external sensors to determine whether stylus device 110 is used in a right hand or left hand and/or track stylus device 110.

A sensor of stylus device 110 may also detect another device used by a user to aid in determination of whether stylus device 110 is used in a left hand or right hand. For example, a user may wear a smartwatch or similar device that may be sensed by stylus device 110 (or vice versa). The smartwatch or similar device (bracelet, etc.) may include a short range electromagnetic transmitter (e.g., NFC, Bluetooth, etc.) that may be detected or otherwise coupled with stylus device 110. The smartwatch may communicate or otherwise couple with stylus device 110. The smartwatch may include profile information for the user indicating whether the user is left-hand or right-hand dominant and/or which wrist a user wears the smartwatch upon. Using the profile information for the smartwatch in addition with a signal strength indicator, it can be inferred which hand stylus device 110 is being used in.

At 506, an orientation of the control device can be determined using the locations of the tracking features of the control device as disclosed herein through the use of unique or semi-unique patterns of tracking features (or an available/non-obstructed combination or subset of them). At 508, the location of the control device in the real world can be translated to a corresponding location in a virtual world as disclosed with regard to FIG. 1. For example, virtual objects can be interacted with in the virtual world as displayed to a user by an HMD by physically moving and otherwise interacting with a control device. The control device may be rendered in virtual space corresponding to a location and/or orientation of the control device in real space.

Certain other functions of a control device may be modified depending on whether the control device is used in a left hand or a right hand. For example, in addition to a left zone or a right zone being depowered, a rear zone can be selectively powered. It can be determined that a rear quadrant of a control device may be facing an external sensor (e.g., of an HMD) by use of an IMU of a control device, for example. If so, a rear zone of emitters, as illustrated in FIG. 3B, may be powered and conversely unpowered when the rear of the stylus is not likely to be viewed by a certain external sensor. In certain embodiments, a control device can be a stylus used to write text that may be recognized by a coupled computer host system. If so, the character recognition algorithms can be modified based on a determination of whether the stylus is being held in a left hand or a right hand.

In certain embodiments, responses to input elements can be reassigned or otherwise adjusted based on a determination of whether a control device is held in a right hand or a left hand. For example, as disclosed herein, input elements may be symmetrically arranged on a control device to enable the same configuration of control device to be used in a left hand or a right hand of a user. The commands implemented in response to actuation of a left input element or a corresponding right input element can be transposed depending on whether the control device is held in a left hand or a right hand. Certain input elements may be ignored or otherwise disabled depending on the left hand/right hand usage of the control device.

In certain embodiments, autocorrection or detection algorithms can be used to detect a character or shape drawn by a user through use of a stylus control device, for example. These algorithms may be modified depending on whether the control device is used in a left hand or a right hand. For example, an upward arching line from left to right may be easier to produce by a user using a control device in a right hand and more difficult by a user using the control device in a left hand. Thus, an autocorrection or detection algorithm can be more aggressive when detecting such an arch when the device is used in the left hand as opposed to the right hand.

Similarly a physiological model used to bound detected movements or possible orientations of a tracked control device can be modified. For example, certain movements of a control device may be capable when held in one hand versus the other due to limitations in the skeletal or muscular systems of the user. With this knowledge, the possible locations and orientations of patterns of tracking features to be searched for can be reduced, thus reducing tracking power usage and/or complexity.

A determination may also be made in certain embodiments of whether a control device is being used in a non-dominant hand. For example, a user profile may indicate that he/she is right hand dominant but is using a control device in a left hand. If so, the control device may be reconfigured (e.g., input elements adjusted, tracking accuracy reduced, autocorrection enhanced, etc.) to better align with the muscle control capabilities of the user via his/her non-dominant hand.

At 510, a function of a user interface device can optionally be modified based on a determination that the interface device is used in a left hand or a right hand of a user as disclosed herein. Certain aspects of the disclosed invention pertain to a virtualization stylus system, including a stylus configured to be held in a right hand or a left hand of a user, the stylus including one or more emitters. The one or more emitters can be powered by an internal power source of the stylus. The one or more emitters can be arranged in at least a left zone and a right zone corresponding to a respective side of the stylus. The stylus can include a sensor configured to detect the one or more emitters of the stylus. The system can include one or more processors coupled to the sensor. The one or more processors can be configured to receive an indication of whether the stylus is to be held in the left hand or the right hand of the user. The one or more processors can also be configured to receive, using the sensor, data indicative of locations in a real space of respective ones of the one or more emitters. The one or more processors can additionally be configured to identify, using the data indicative of the location of the respective ones of the one or more emitters, an orientation of the stylus in the real space. The one or more processors can be configured to translate the orientation of the stylus in the real space for representation in a virtualized space. The one or more processors can also be configured to power, based on the indication of whether the stylus is to be held in the left hand or the right hand of the user, the left zone of the one or more emitters in response to the indication indicating that the stylus is to be held in the left hand of the user. The one or more processors can be configured to power, based on the indication of whether the stylus is to be held in the left hand or the right hand of the user, the right zone of the one or more emitters in response to the indication indicating that the stylus is to be held in the right hand of the user.

The virtualization stylus system can further comprise a head mounted display unit wherein the sensor is attached to the head mounted display unit. The one or more processors can be configured to render on the head mounted display unit, the virtualized space including a representation of the stylus in the virtualized space corresponding to the orientation of the stylus in the real space. The sensor can be a camera and the one or more emitters can be light emitters.

Techniques are disclosed pertaining to a virtualization stylus system including a stylus configured to be held in a right hand or a left hand of a user. The system can include a sensor configured to detect one or more tracking features of the stylus. The system can also include one or more processors coupled to the sensor. The one or more processors can be configured to receive an indication of whether the stylus is to be held in the left hand or the right hand of the user. The one or more processors can also be configured to receive, using the sensor, data indicative of locations in a real space of respective ones of the one or more tracking features. The one or more processors can also be configured to identify, using the data indicative of the location of the respective ones of the one or more tracking features, an orientation of the stylus in the real space. The one or more processors can additionally be configured to translate the orientation of the stylus in the real space for representation in a virtualized space. The one or more processors can further be configured to modify, based on the indication of whether the stylus is to be held in the left hand or the right hand of the user, a function of the stylus.

The one or more tracking features can include emitters located on the stylus and arranged into at least a left zone and a right zone. The function can include powering either the left zone of emitters or the right zone of emitters. The emitters can be further arranged into at least a rear zone. The one or more processors can be configured to detect whether the stylus is oriented such that the rear zone is facing towards the sensor and, in response, power the rear zone of emitters. The detecting whether the stylus is oriented such that the rear zone is facing towards the sensor can be based on one or more readings from an inertial measurement unit of the stylus. The stylus can include one or more input elements and wherein the function includes assigning a different response to actuation of the one or more input elements based on the indication of whether the stylus is to be held in the left hand or the right hand of the use. The function can include a character recognition function that is modified based on the indication of whether the stylus is to be held in the left hand or the right hand of the user. The one or more processors are configured to identify a pose, based on the indication of whether the stylus is to be held in the left hand or the right hand of the user of the stylus, using a first set of the one or more tracking features; and after identifying the pose of the stylus, track orientation of the stylus in the real space using a second set of the one or more tracking features. The function can include the tracking the orientation of the stylus in the real space using the second set of the one or more tracking features.

As used in this specification, any formulation used of the style "at least one of A, B or C," and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word "comprising" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles ""a"" or ""an"" limits any particular claim containing such introduced claim element to inventions containing only one such element, even when the same claim includes the introductory phrases ""one or more"" or ""at least one"" and indefinite articles such as ""a"" or ""an."" The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, examples or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim (s). Moreover, this also applies to the phrase "in one embodiment," "according to an embodiment" and the like, which are merely a stylistic form of wording and are not to be construed as limiting the following features to a separate embodiment to all other instances of the same or similar wording. This is to say, a reference to "an", "one" or "some" embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A virtualization stylus system, comprising:
a stylus configured to be held in a right hand or a left hand of a user, the stylus including one or more emitters;
a head-mounted display (HMD) device including:
a housing;
a head-mounting apparatus coupled to the housing, the head-mounting apparatus configured to couple the HMD device with a head of the user;
a display coupled to the housing in an orientation such that it is viewable by the user when the HMD device is coupled with the head of the user;
one or more sensors coupled to the housing, the one or more sensors configured to have a field of view including the right hand or the left hand of the user when the HMD device is coupled with the head of the user; and
one or more processors coupled to the one or more sensors and the housing;
a non-transitory computer-readable medium communicatively coupled to the one or more processors, wherein the one or more processors execute program code stored in the non-transitory computer-readable medium, wherein the non-transitory computer readable medium includes instructions to:
receive an indication of whether the stylus is to be held in the left hand or the right hand of the user;
receive, using the sensor, data indicative of locations in a real space of respective ones of the one or more emitters;
identify, using the data indicative of the location of the respective ones of the one or more emitters, an orientation of the stylus in a real space wherein the orientation is determined based on the indication of whether the stylus is to be held in the left hand or the right hand of the user;
modify one of the receive and identify instructions based on whether the stylus is held in the left hand or the right hand of the user;
translate the orientation of the stylus in the real space for representation in a virtualized environment viewable by the user via the display when the HMD device is coupled with the head of the user; and
render the stylus in the virtualized environment in an orientation corresponding to the orientation of the stylus in the real space.

2. The virtualization stylus system of claim 1, wherein:
the one or more emitters form a different pattern on a left side of the stylus than the right side of the stylus; and
the identification of the orientation of the stylus based on the indication of whether the stylus is to be held in the left hand or the right hand of the user includes searching for either a left side pattern of the emitters or a right side pattern of the emitters.

3. The virtualization stylus system of claim 1, wherein the identification of the orientation of the stylus based on the indication of whether the stylus is to be held in the left hand or the right hand of the user includes prioritizing a respective left-hand side or right-hand side subset of the field of view of the one or more sensors.

4. The virtualization stylus system of claim 1, wherein the one or more emitters are light emitters and the one or more sensors are configured to detect light emitted by the one or more emitters.

5. A virtualization stylus system, comprising:
a stylus configured to be held in a right hand or a left hand of a user, the stylus including one or more tracking features;

a sensor configured to detect the one or more tracking features of the stylus; and one or more processors coupled to the sensor;

a non-transitory computer-readable medium communicatively coupled to the one or more processors, wherein the one or more processors execute program code stored in the non-transitory computer-readable medium, wherein the non-transitory computer readable medium includes instructions to:

receive an indication of whether the stylus is to be held in the left hand or the right hand of the user;

receive, using the sensor, data indicative of locations in a real space of respective ones of the one or more tracking features;

identify, using the data indicative of the location of the respective ones of the one or more tracking features, an orientation of the stylus in a real space wherein the orientation is determined based on the indication of whether the stylus is to be held in the left hand or the right hand of the user; and translate the orientation of the stylus in the real space for representation in a virtualized space.

6. The virtualization stylus system of claim 5, wherein the sensor is external to the stylus.

7. The virtualization stylus system of claim 5, wherein the indication of whether the stylus is to be held in the left hand or the right hand of the user is determined based on a profile of the user of the stylus wherein the profile indicates whether the user uses the stylus in his/her left hand or his/her right hand.

8. The virtualization stylus system of claim 5, wherein the indication of whether the stylus is to be held in the left hand or the right hand of the user is determined based on one or more readings from an inertial measuring unit (IMU) of the stylus.

9. The virtualization stylus system of claim 8, wherein the indication of whether the stylus is to be held in the left hand or the right hand of the user is determined based on an orientation of the stylus determined using the IMU compared to a gravity vector.

10. The virtualization stylus system of claim 8, wherein the indication of whether the stylus is to be held in the left hand or the right hand of the user is determined based on an orientation of the stylus determined by comparing a magnetic vector determined using the IMU of the stylus and comparing the magnetic vector of the stylus with a magnetic vector of an IMU of an external virtualization host device.

11. The virtualization stylus system of claim 5, wherein the non-transitory computer readable medium further includes instructions to:

identify a pose, based on the indication of whether the stylus is to be held in the left hand or the right hand of the user of the stylus, using a first set of the one or more tracking features; and after identifying the pose of the stylus, track orientation of the stylus in the real space using a second set of the one or more tracking features.

12. The virtualization stylus system of claim 5, wherein the stylus includes one or more input elements and the indication of whether the stylus is to be held in the left hand or the right hand of the user is based on detected pressure applied to the one or more input elements.

13. A method of operating a virtualization stylus system, comprising:

receiving, at one or more processors, an indication of whether a stylus is to be held in a left hand or a right hand of a user, wherein the stylus includes one or more tracking features;

receiving, at the one or more processors, using a sensor configured to detect the one or more tracking features of the stylus, data indicative of locations in a real space of respective ones of the one or more tracking features;

identifying, at the one or more processors, using the data indicative of the location of the respective ones of the one or more tracking features, an orientation of the stylus in the real space wherein the orientation is determined based on the indication of whether the stylus is to be held in the left hand or the right hand of the user; and translating, at the one or more processors, the orientation of the stylus in the real space for representation in a virtualized space.

14. The method of claim 13, wherein the sensor is external to the stylus.

15. The method of claim 13, wherein the indication of whether the stylus is to be held in the left hand or the right hand of the user is determined based on a profile of the user of the stylus wherein the profile indicates whether the user uses the stylus in his/her left hand or his/her right hand.

16. The method of claim 13, further comprising:

modifying an autocorrection or detection algorithm based on whether the stylus is held in the right hand or left hand of the user.

17. The method of claim 13, wherein the indication of whether the stylus is to be held in the left hand or the right hand of the user is determined based on an orientation of the stylus determined using an inertial measuring unit (IMU) compared to a gravity vector.

18. The method of claim 13, wherein the indication of whether the stylus is to be held in the left hand or the right hand of the user is determined based on an orientation of the stylus determined by comparing a magnetic vector determined using an inertial measuring unit (IMU) of the stylus and comparing the magnetic vector of the stylus with a magnetic vector of an IMU of an external virtualization host device.

19. The method of claim 13, further comprising:

identifying, at the one or more processors, a pose, based on the indication of whether the stylus is to be held in the left hand or the right hand of the user, using a first set of the one or more tracking features; and after identifying the pose of the stylus, track orientation of the stylus in the real space using a second set of the one or more tracking features.

20. The method of claim 13, wherein the stylus includes one or more input elements and the indication of whether the stylus is to be held in the left hand or the right hand of the user is based on detected pressure applied to the one or more input elements.

* * * * *